United States Patent
Seydoux et al.

(10) Patent No.: US 7,093,672 B2
(45) Date of Patent: Aug. 22, 2006

(54) SYSTEMS FOR DEEP RESISTIVITY WHILE DRILLING FOR PROACTIVE GEOSTEERING

(75) Inventors: Jean Seydoux, Sugar Land, TX (US); Dzevat Omeragic, Sugar Land, TX (US); Jacques R. Tabanou, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 444 days.

(21) Appl. No.: 10/707,985

(22) Filed: Jan. 29, 2004

(65) Prior Publication Data

US 2004/0154831 A1 Aug. 12, 2004

Related U.S. Application Data

(60) Provisional application No. 60/319,937, filed on Feb. 11, 2003.

(51) Int. Cl.
*E21B 25/00* (2006.01)
*G01J 3/18* (2006.01)

(52) U.S. Cl. ........................................ 175/24; 324/339
(58) Field of Classification Search ................. None
See application file for complete search history.

(56) References Cited

U.S. PATENT DOCUMENTS

| | | | |
|---|---|---|---|
| 4,471,436 A | 9/1984 | Schaefer et al. | |
| 4,513,376 A | 4/1985 | Barber | |
| 5,157,605 A | 10/1992 | Chandler et al. | |
| 5,812,068 A * | 9/1998 | Wisler et al. ............ | 340/855.5 |
| 5,883,515 A * | 3/1999 | Strack et al. ................ | 324/339 |
| 6,188,222 B1 | 2/2001 | Seydoux et al. | |
| 6,308,136 B1 * | 10/2001 | Tabarovsky et al. ........... | 702/7 |
| 6,476,609 B1 | 11/2002 | Bittar | |
| 6,594,584 B1 | 7/2003 | Omeragic et al. | |
| 2004/0046560 A1 | 3/2004 | Itskovich et al. | |
| 2004/0046561 A1 | 3/2004 | Itskovich et al. | |

FOREIGN PATENT DOCUMENTS

GB 2301902 12/1996

* cited by examiner

*Primary Examiner*—Frank Tsay
(74) *Attorney, Agent, or Firm*—James Kurka; Kevin P. McEnanay; Bryan L. White

(57) ABSTRACT

A method for geosteering while drilling a formation includes generating a plurality of formation models for the formation, where each of the plurality of the formation models includes a set of parameters and a resistivity tool therein and locations of the resistivity tool differ in the plurality of the formation models. The method may also include computing predicted tool responses for the resistivity tool in the plurality of formation models, acquiring resistivity measurements using the resistivity tool in the formation, and determining an optimum formation model based on a comparison between the actual tool response and the predicted tool responses. The method may also include steering a bottom home assembly based on the optimum formation model.

33 Claims, 12 Drawing Sheets

SYSTEMS FOR DEEP RESISTIVITY WHILE DRILLING FOR PROACTIVE GEOSTEERING

CROSS REFERENCE TO RELATED APPLICATIONS

This application claims the priority from U.S. Provisional Application No. 60/319,937 filed on Feb. 11, 2003. This Provisional Application is incorporated by reference in its entirety.

BACKGROUND OF INVENTION

1. Field of the Invention

The invention relates generally to well logging using resistivity logging tools. More particularly, the invention relates to methods for processing signals from an electromagnetic well-logging tool to determine formation properties and a desired well path through the formation.

2. Background Art

Wells are generally drilled through formations in the Earth's crust so that materials trapped reservoirs in the formations, such as petroleum, can be recovered. Often a well is drilled horizontally through a reservoir to increase the drainage area in the reservoir. Because many of these formations are layered, the position of the well with respect to the boundaries of the layers can be very important. For example, a poorly placed well may have a much lower productivity than if the well had been drilled in a better location.

Because knowing the exact location of a horizontal borehole in a reservoir is critical to maximize production, various techniques have been developed to determine the location of a wellbore in a formation. These techniques include seismic surveys, resistivity measurements, etc. Seismic surveys are the most commonly used in locating the well path in the formation, due to its ability to probe far into the formation. However, seismic surveys are incapable of providing the desired resolution and accuracy to accurately predict the location of the borehole.

Other measurements, such as gamma ray and resistivity measurements, are more accurate and can provide better resolution. Resistivity measurements are often made with electromagnetic (EM) tools. EM logging tools have an elongated support equipped with antennas that are operable as sources or sensors. The antennas on these tools generally comprise loops or coils of conductive wire. In operation, a transmitter antenna is energized by an alternating current to emit EM energy (magnetic field) through the borehole fluid ("mud") and into the surrounding formations. The magnetic field induces eddy currents in the formation that in turns induce secondary magnetic fields. The secondary magnetic fields then induce signals in the receivers that are disposed at a distance from the transmitter. The magnitudes of the detected signals reflect the formation resistivity. The signals detected by the receiver may be separated into real signals (R-signals) that are in-phase with the transmitter signal and quadrature signals (X-signals) that are out-of-phase with respect to the transmitter signals. By processing the detected signals, a log or profile of the formation and/or borehole properties may be determined. Conventional resistivity tools, however, often cannot "read" far enough into the formation to define the location of the borehole with respect to formation layer boundaries.

Other EM logging tools use propagation techniques to measure the resistivity of the formation. A propagation tool measures the amplitudes, phase shifts, and attenuation of EM signals in the formation to determine the resistivity of the formation.

Recently, a resistivity tool capable of deep reading is disclosed in U.S. Pat. No. 6,188,222 B1 issued to Seydoux et al. and assigned to the assignee of the present invention. This tool includes a long spacing between the transmitter and the receiver, and it takes advantage of the telemetry signals carrying measurement data from down-hole sensors through the formation to a measurement-while-drilling ("MWD") receiver located higher in the bottom hole assembly ("BHA"). The transmitted signals are decoded by the MWD receiver to extract signal amplitudes, that is used to determine formation resistivity. In addition, changes in the signal amplitude are also used to indicate formation boundaries for determining well location during directional drilling.

Measurement data from logging tools, such as the deep reading resistivity tool disclosed in the Seydoux patent, are typically processed using an inversion method to determine a position of a wellbore with respect to layer boundaries in earth formations. Exemplary inversion methods for calculating a distance between a well logging instrument and a formation boundary from the logging data, for example, may be found in U.K. published patent application GB 2 301 902 A filed by Meyer and in U.S. Pat. No. 6,594,584 B1 issued to Omeragic et al. and assigned to the assignee of the present invention.

An inversion technique, such as that disclosed in the Omeragic patent, involves making an initial estimate or model of the geometry of earth formations and the properties of the formations surrounding the well logging instrument. The initial model parameters are derived in various ways known in the art. An expected logging instrument response is calculated based on the initial model. The calculated response is then compared with the measured response of the logging instrument. The difference between the calculated response and the measured response is used to adjust the parameters of the initial model. The adjusted model is again used to calculate an expected response of the well logging instrument. The expected response for the adjusted model is compared to the measured instrument response, and any difference between them is used to adjust the model. This process is repeated until the differences between the expected response and the measured response fall below a pre-selected threshold.

While these prior art resistivity tools and methods can sometimes provide satisfactory results in locating well-bore in the formations, better apparatus and methods are needed, in particular for geosteering during drilling horizontal wells.

SUMMARY OF INVENTION

In some embodiments, the invention relates to a method for geosteering while drilling a formation. The method includes generating a plurality of formation models for the formation, where each of the plurality of the formation models includes a set of parameters and a deep reading logging-while-drilling resistivity tool therein and locations of the deep reading logging-while-drilling resistivity tool differ in the plurality of the formation models. The method may also include computing predicted tool responses for the a deep reading logging-while-drilling resistivity tool in the plurality of formation models, acquiring resistivity measurements using the deep reading logging-while-drilling resistivity tool in the formation, and determining an optimum formation model based on a comparison between the actual tool response and the predicted tool responses. The method may also include steering a bottom home assembly based on the optimum formation model.

In other embodiments, the invention relates to a method for geosteering that includes obtaining an optimum formation model derived from data from a deep reading logging-while-drilling resistivity tool using an inversion technique and steering a bottom hole assembly to locate a well in a selected position with respect to formation boundaries.

In some other embodiments, the invention relates to a system for geosterring while drilling in a formation that includes a computer having a processor and a memory, wherein the memory stores a program having instructions for generating a plurality of formation models for the formation, and wherein each of the plurality of the formation model includes a set of parameters and a deep reading logging-while-drilling resistivity tool therein, wherein locations of the deep reading logging-while-drilling resistivity tool differ in the plurality of the formation models. The instructions may also be for computing predicted tool responses for the deep reading logging-while-drilling resistivity tool in the plurality of formation models, acquiring resistivity measurements using the deep reading logging-while-drilling resistivity tool in the formation, determining an optimum formation model based on a comparison between the actual tool response and the predicted tool responses, and selecting a steering solution for the bottom hole assembly.

In other embodiments, the invention relates to a system for geosteering while drilling in a formation that includes a computer having a processor and a memory, wherein the memory stores a program having instructions for obtaining an optimum formation model derived from data from a deep reading logging-while-drilling resistivity tool using an inversion technique, and selecting a steering solution for the bottom hole assembly.

In other embodiments the invention relates to a method for well characterization while drilling a formation that includes generating a plurality of formation models for the formation, wherein each of the plurality of the formation model includes a set of parameters and a deep reading resistivity tool therein, wherein locations of the deep reading resistivity tool differ in the plurality of the formation models, computing predicted tool responses for the deep reading resistivity tool in the plurality of formation models, acquiring resistivity measurements using the deep reading resistivity tool in the formation, and determining a formation resistivity profile in a transition zone.

Other aspects and advantages of the invention will be apparent from the following description and the appended claims.

DETAILED DESCRIPTION

In certain embodiments, the invention relates to methods for geosteering using deep reading resistivity tools. In accordance with some embodiments of the invention, resistivity measurements are made while drilling a wellbore. The measurements are compared with the expected measurement data based on selected formation models. An optimum formation model, including the borehole location in formation layers, is determined from this comparison. Information of the borehole location is then used to control the drilling directions. In other embodiments, the invention may be used on a wireline tool to make "time lapse" measurements to determine how the formation properties have changed over time as the well is being produced. Additionally, certain embodiments of the invention relate to sensor equipment that is permanently installed in a well for permanent monitoring applications.

Figure 1:
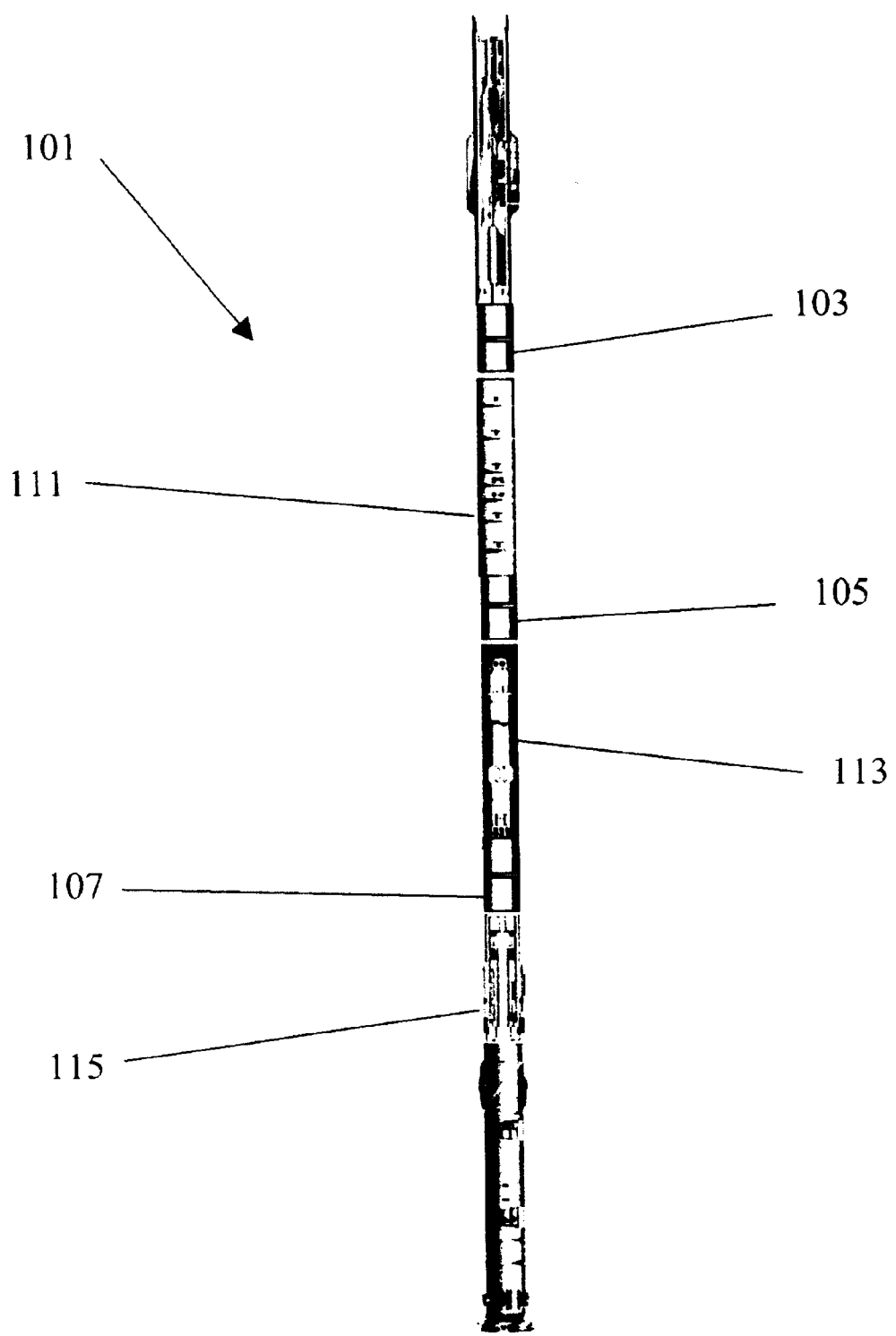
FIG. 1 shows a ultra deep resistivity tool in accordance with one embodiments of the invention.

It is noted that the invention makes reference to "resistivity tools" and measuring a "resistivity." In fact, induction-type resistivity tools measure an EM field produced by eddy currents in the formation. These eddy currents are proportional to the conductivity of the formation, and conductivity is the reciprocal of resistivity. The term "resistivity" is used generally to mean any such measurement or value. The invention is not intended to be limited by the use of the word "resistivity." FIG. 1 shows a logging-while-drilling ("LWD") assembly 101 in accordance with one embodiment of the invention. The LWD assembly 101 includes a number of different sensors for making measurements related to formation properties. For example, the assembly 101 shown in FIG. 1 may include a shallow resistivity induction tool, such as at 111 or 115, and a gamma ray detector 113.

The LWD assembly 101 in FIG. 1 also includes an ultra deep resistivity ("UDR") tool that has a much larger radial sensitivity than prior art resistivity tools. The larger radial sensitivity enables the UDR tool to detect lithology features and fluid contacts that are on the order of tens of meters away from the borehole (not shown). In a horizontal well, a UDR tool enables the determination of the distance from the tool to reservoir boundaries and fluid contacts, such as an oil-to-water contact ("OWC").

The UDR tool includes a first transmitter 103, a second transmitter 105, and a receiver 107. The second transmitter 105 is called the "short spaced" transmitter because it is spaced closer to the receiver 107 than the first transmitter 103, which is called the "long spaced" transmitter. It is noted that the principle of reciprocity applies and a transmitter may be used as a receiver, and vice versa. Therefore, the UDR tool shown in FIG. 1 is equivalent to a tool having a transmitter and a short and a long spaced receivers. The principle of the tool operation is the same. Thus, any reference to a "transmitter" or "receiver" in this description is for clarity of illustration, and it is not intended to limit the scope of the invention to the recited configurations. Additionally, one of ordinary skill in the art would appreciate that the specific configuration shown in FIG. 1 is for illustration only and a deep reading induction tool for use with embodiments of the invention may include more receivers and/or transmitters. A specific tool configuration may be selected based on the desired application.

In a vertical well, the resolution of a conventional induction tool is often needed to differentiate each layer through which the tool passes. These conventional induction tools typically have arrays that have spacings from a few inches to a few feet (typically less than 8 feet or 2.7 meters). These spacings provide sufficient depth of investigation and resolution for most logging operations. The advent of horizontal drilling, along with the desire to place the well within the pay zone to improve the production efficiency, has created a need for an induction tool with a greater depth of investigation.

An induction tool in accordance with embodiments of the invention may be a deep reading induction tool. A "deep reading" induction tool may have arrays with spacings on the order of several meters to tens of meters. In one embodiment, the short spacing (i.e., the distance between the receiver 107 and the short spaced transmitter 105) is about 11 meters, and the long spacing (i.e., the distance between the receiver 107 and the long spaced transmitter 103) is about 21 meters. By locating the transmitters at these distances from the receiver, the resolution of the induction tool is decreased, but the depth of investigation (DOI) of the tool is significantly increased. The UDR configuration illustrated in FIG. 1 includes only the essential components for clarity of illustration. One of ordinary skill in the art would appreciate that, in some embodiments, a resistivity array may also include a bucking coil disposed between the transmitter and the receiver. A bucking coil acts to reduce or remove mutual couplings between the transmitter and the receiver. In other embodiments, a bucking coil may not be necessary because of the large spacing between the coils.

In some embodiments, the transmitters 103, 105 and the receiver 107 are located in separate subassemblies (subs) on the bottom hole assembly ("BHA"). This arrangement enables other tools and downhole equipment to be located between the elements of a UDR tool. For example, as discussed above, the UDR tool shown in FIG. 1 includes a shallow induction tool 111 between the first transmitter 103 and second transmitter 105, and it includes a gamma ray tool 113 between the second transmitter 105 and the receiver 107. As will be described below, the information gained from other sensors in the BHA, such as a shallow induction tool 115 and a gamma ray tool 113, may be used in conjunction with the information gained from the UDR tool to yield additional information about the formation and the fluid in the formation.

One of ordinary skill in the art would appreciate that induction tools may be operated at several frequencies to provide the desired measurements. Higher frequencies provide better resolution and better signal-to-noise ratios. However, high frequencies are more susceptible to skin effects, especially in conductive formations. Skin effects result from eddy currents induced in regions adjacent to the region of investigation. These eddy currents act to limit the depths of investigation (DOI) and to reduce the magnitudes of signals detected by the receivers. Thus, in some embodiments, corrections may be performed to remove skin effects, as is known in the art. This may enable accurate determination of the formation resistivities from the measurement data. Methods for such corrections, for example, include phasor processing disclosed in U.S. Pat. Nos. 4,513,376 issued to Barber and 4,471,436, issued to Schaefer, et al. Both these patents are assigned to the assignee of the present invention.

In comparison, low frequency operations are less sensitive to skin effects and can read farther into the formation. However, low frequencies are associated with lower resolution and lower signal-to-noise ratios. One of ordinary skill in the art would appreciate that, in some embodiments, measurements at different frequencies may be combined to provide a desired geometric factor, e.g., to reduce skin effects or to achieve a "focused" region of investigation. One example of combining resistivity measurements at different frequencies is disclosed in U.S. Pat. No. 5,157,605 issued to Chandler et al. and assigned to the assignee of the present invention.

In accordance with embodiments of the invention, a UDR tool may operate at a plurality of frequencies when taking measurements of a formation. For example, in at least one embodiment, a UDR tool in accordance with the invention may be operated at 2 kHz, 10 kHz, and 100 kHz. One of ordinary skill in the art would appreciate that other frequencies may be used without departing from the scope of the invention. By operating at different frequencies, a tool of the invention may acquire an extensive set of resistivity data with a simple two-array configuration shown in FIG. 1.

It is also noted that a UDR tool may include a propagation tool. A propagation tool is able to determine the resistivity of the formation by measuring the amplitude, attenuation, and phase shift on an EM signal transmitted into the formation. Certain embodiments of the invention include a propagation tool, or other types of resistivity tools, in place of an induction tool.

In accordance with embodiments of the invention, the resistivity data acquired by the UDR tool are compared with the expected data that have been calculated from reservoir models (or formation models) in order to derive, for example, the location of the wellbore with respect to formation layer boundaries. A formation/reservoir model may be defined by a number of parameters that may include resistivity and the thickness of the layers. A formation model, in accordance with the invention, may also include petro-physical parameters that define the formation, such as the saturation and the pore distribution, and water saturation. Such reservoir models may be based on information obtained from nearby pilot wells. Embodiments of the invention may use reservoir models having any number or combination of lithology features.

Figure 2:
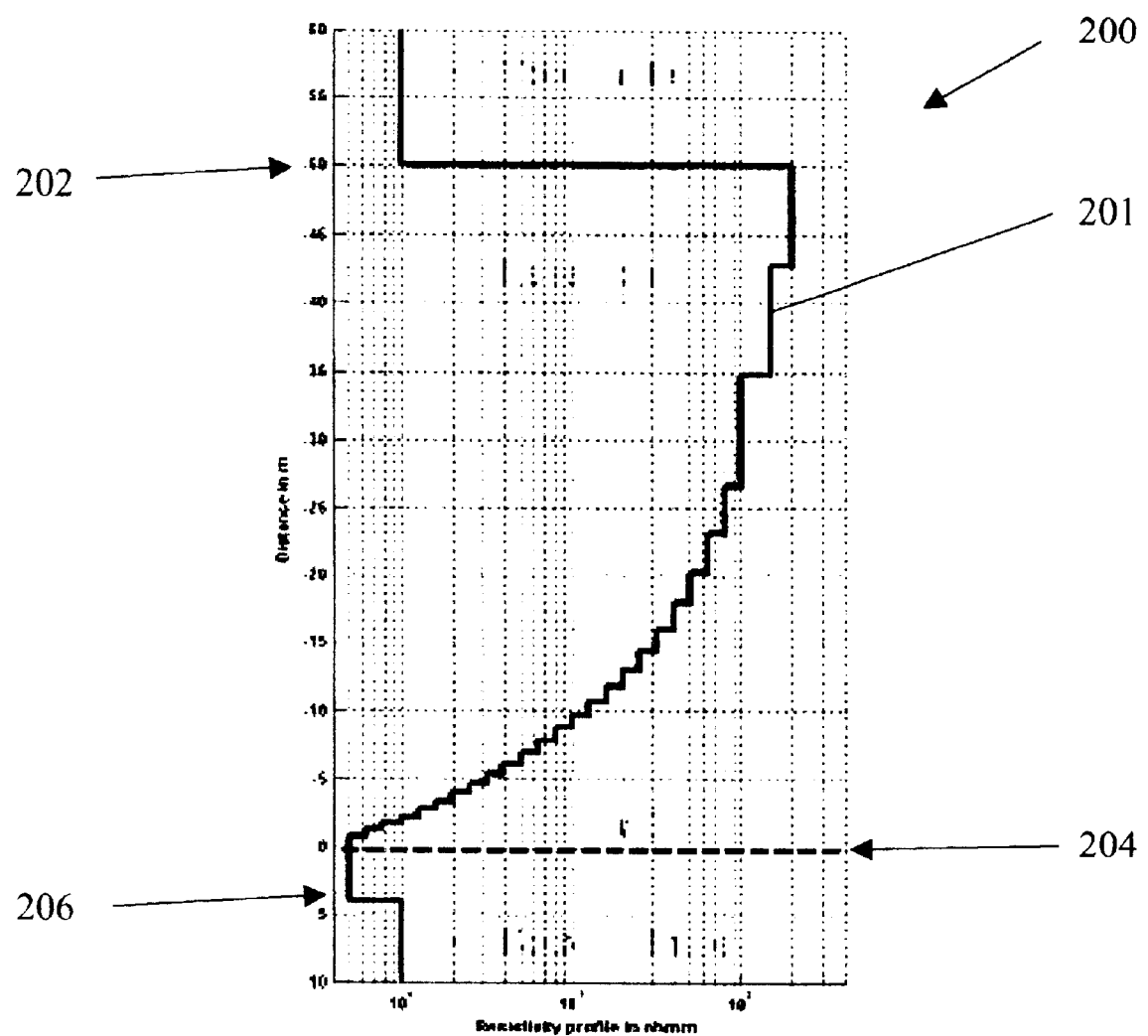
FIG. 2 shows one example of a predicted resistivity profile in accordance with one embodiment of the invention.

FIG. 2 shows a reservoir model having a top shale layer, a hydrocarbon reservoir layer that is in contact with water at the oil-water contact (OWC), and a bottom shale below the water layer. A resistivity profile 201 of this reservoir is also shown. A resistivity profile with a changing slope, such as the one shown in FIG. 2, generally indicates a resistivity that changes with depth. This is known as a "transition zone" because the resistivity changes throughout the zone. The vertical dimension is represented on the Y axis of the graph. By convention, the OWC is represented at a height of 0, and all other vertical dimensions are measured relative to this point. The top section, which has a low resistivity (i.e., high conductivity), represents a top shale layer. In FIG. 2, this is shown above the level (bed boundary) indicated at 202. At the level indicated at 202, the resistivity profile shows a jump from the low resistivity of the shale to a high resistivity (i.e., low conductivity). The high resistivity below the level indicated at 202 indicates an oil reservoir.

Between the levels (bed boundaries) indicated at 202 and 204, the resistivity profile 201 of the well gradually decreases moving downwardly (towards OWC) through the reservoir. The gradual decrease in the resistivity shown in curve 201 indicates the existence of a wide transition zone in which water saturation gradually increases as one moves closer to the OWC. At the bottom of the reservoir, the resistivity profile reaches a very low level at bed boundary 204 the OWC. Below the OWC (at bed boundary 204), the resistivity reflects that of the water layer. Further below, the resistivity again makes a small jump, indicating the existence of a bottom shale layer, which occurs below the bed boundary 206.

The Y-axis of the graph shown in FIG. 2 represents the depth in the formation with respect to some reference point on the surface. This is typically called the true vertical depth ("TVD"). In some embodiments, the depths may be shown in relative terms, using OWC as the reference point. As is also customary in the art, the depth increases in the downward direction. Other depth measurements are also used in the art. For example, the "measured depth" ("MD") represents the length of the well trajectory from the beginning of the well. This is typically determined by the length of the drill string that has been lowered into the well. Another depth measurement is called the "horizontal depth" ("HD"). This represents the horizontal distance that the BHA has traveled with respect to some reference point. For example, the HD may be measured as the horizontal distance from a vertical pilot hole that has been drilled through the formations.

Figure 3A:
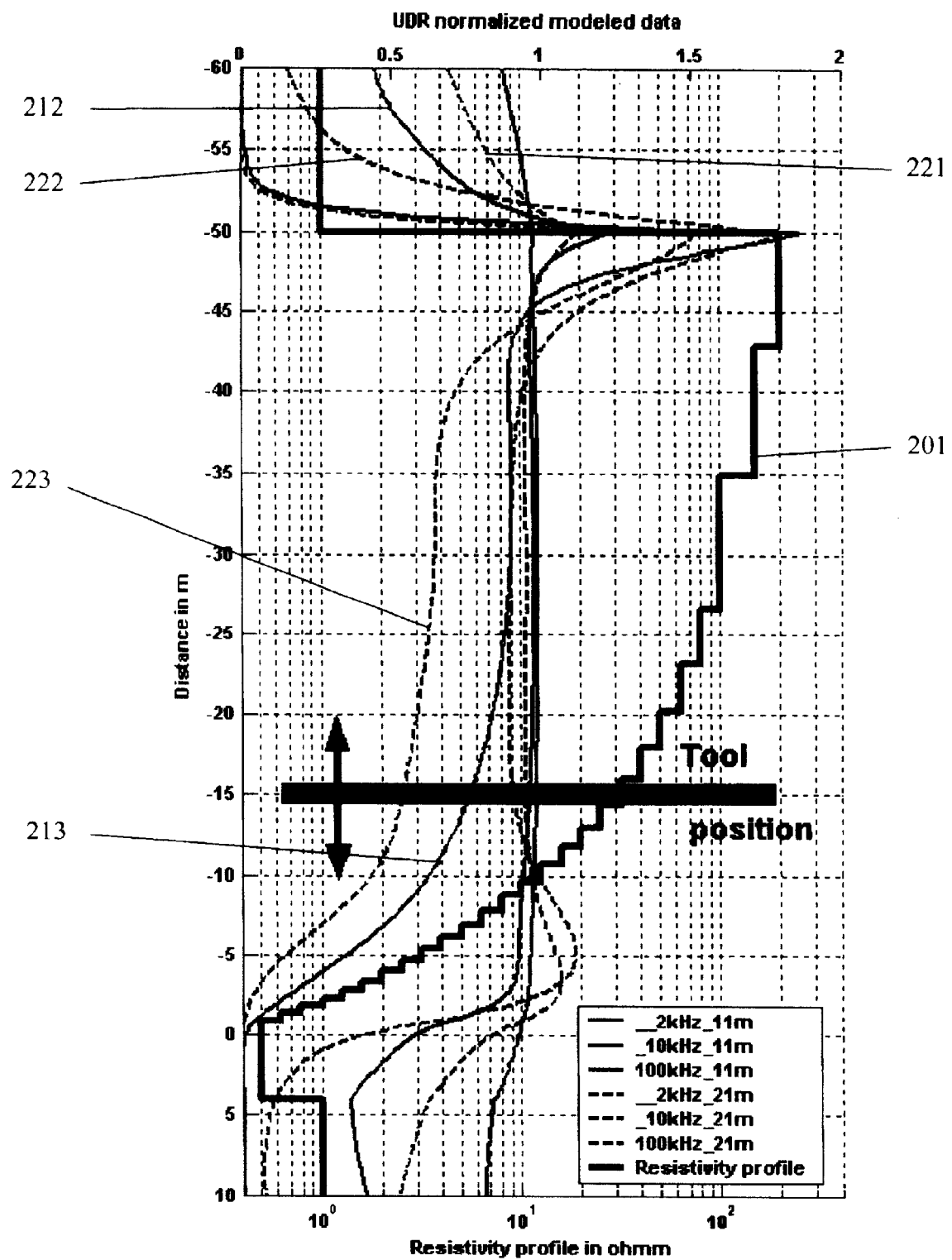
FIG. 3A shows examples of predicted tool responses based on a predicted resistivity profile in accordance with one embodiment of the invention.

Based on a formation model, such as that shown in FIG. 2, simulated tool responses may be calculated for different tool positions within the formation. FIG. 3A shows one example of modeled tool responses based on the reservoir model in FIG. 2.

The resistivity profile 201 shown in FIG. 2 is shown again in FIG. 3A, and the modeled tool response curves (i.e., 211, 212, 213, 221, 222, 223) are superimposed on the graph to show the predicted tool responses at each vertical position (shown on the Y-axis) in a reservoir with the modeled reservoir resistivity profile 201. The response curves 211, 212, 213 represent the "expected" responses of the short array (11 meter) operating at 2 KHz, 10, KHz, and 100 KHz, respectively. Similarly, the response curves 221, 222, 223 represent the "expected" responses of the long array (21 meter) operating at 2 KHz, 10, KHz, and 100 KHz, respectively.

As can be seen, the predicted responses of the tool at each frequency have different patterns based on the formation resistivity. The formation resistivity is predicted based on the predicted lithology of the formation. In accordance with embodiments of the invention, the combination of the responses at the different spacings and different frequencies would enable an accurate location of the wellbore in the formation or reservoir.

Figure 3B:
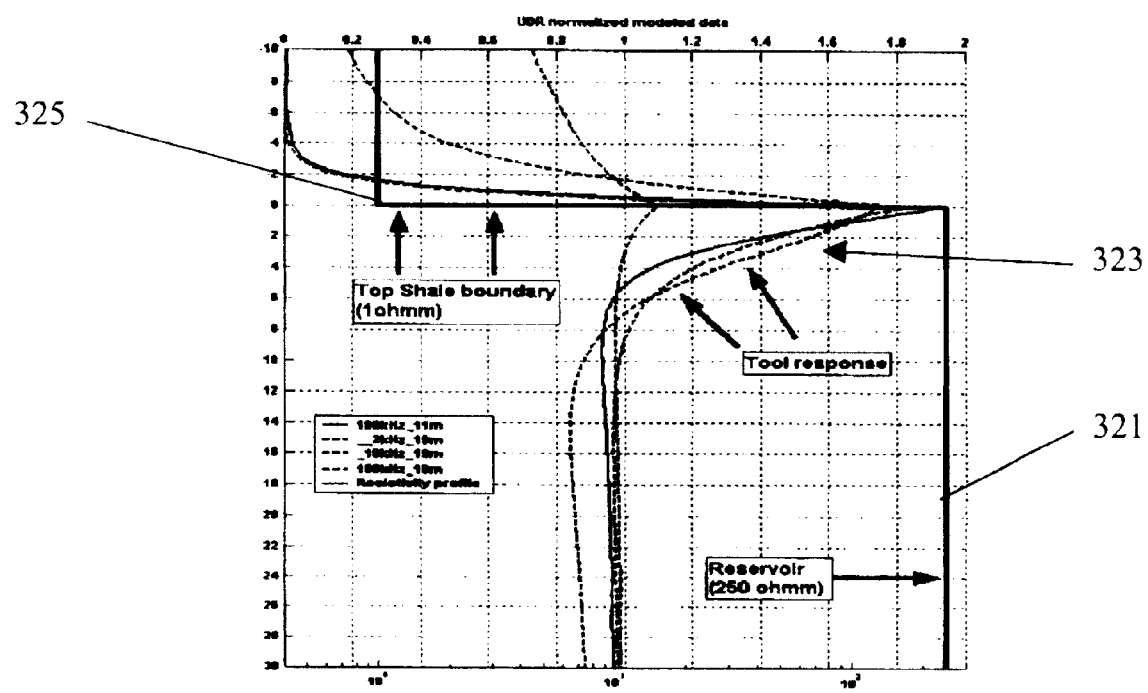
FIG. 3B shows examples of predicted tool responses based on another predicted resistivity profile in accordance with one embodiment of the invention.

The reservoir model shown in FIG. 2 is a typical 1D formation model because the resistivity in the reservoirs varies with one parameter the vertical depth. Other 1D-like models may also include those shown in FIGS. 3B–3D. FIG. 3B shows an example of a reservoir model having a step resistivity profile 321. The resistivity profile 321 includes a high resistivity reflecting a hydrocarbon reservoir below the bed boundary 325 and a low resistivity reflecting a top shale above that bed boundary 325. The predicted tool response curves, again for different array spacings and operating frequencies, are also shown.

Figure 3C:
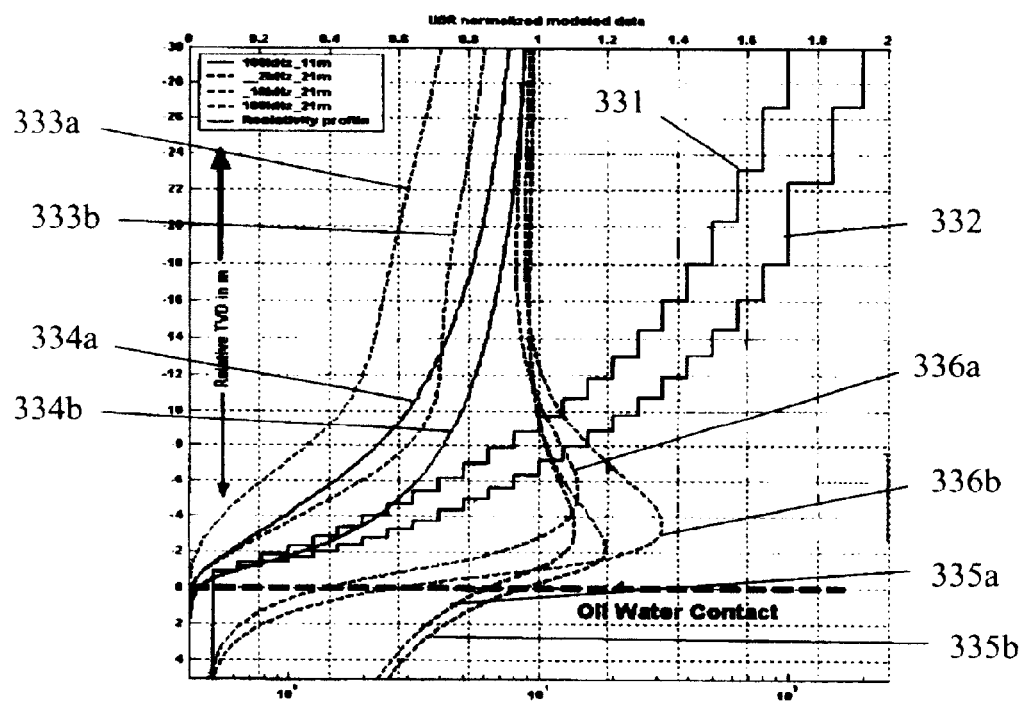
FIG. 3C shows the two different tool responses based on two possible predicted resistivity profiles in accordance with one embodiment of the invention.

FIG. 3C shows how the predicted tool response may vary based on different predicted resistivity profiles. FIG. 3C includes two possible resistivity profiles 331, 332 for a given formation. The second profile 332 has a much steeper slope than the first profile 331. A tool response for each of the profile 331, 332 may be generated for the various spacings and frequencies.

For example, curve 334a shows a predicted tool response of the short spacing (i.e., 11 meters) at 100 kHz for the first profile 331. Curve 334b shows a predicted tool response of the short spacing at 100 kHz for the second profile 332. These curves 334a, 334b have different magnitudes based on the differing slopes of the profiles 331, 332.

Curves 333a and 333b show predicted tool responses of the long spacing (i.e., 21 meters) at 100 kHz for the first 331 and second 332 predicted resistivity profiles, respectively. As with the predicted responses curves 334a, 334 for 100 kHz short spacing, the curves 333a, 333b for the 100 kHz long spacing have different magnitudes based on the different slopes of the two predicted resistivity profiles 331, 332.

In another example, curve 336a shows the predicted tool response of the long spacing at 10 kHz for the first resistivity profile 331, and curve 336b shows the predicted tool response of the long spacing at 10 kHz for the second resistivity profile 332. These curves 336a, 336b show spikes of different magnitudes as the tool approaches the OWC. The different magnitudes of the spikes are attributable to the different slopes of the two resistivity profiles 331, 332.

Similarly, curves 335a, 335b show the predicted tool response of the long spacing at 2 kHz for the first 331, and second 332 resistivity profiles, respectively. These curves have different responses to the resistivity profiles as the tool approaches the OWC.

Figure 3D:
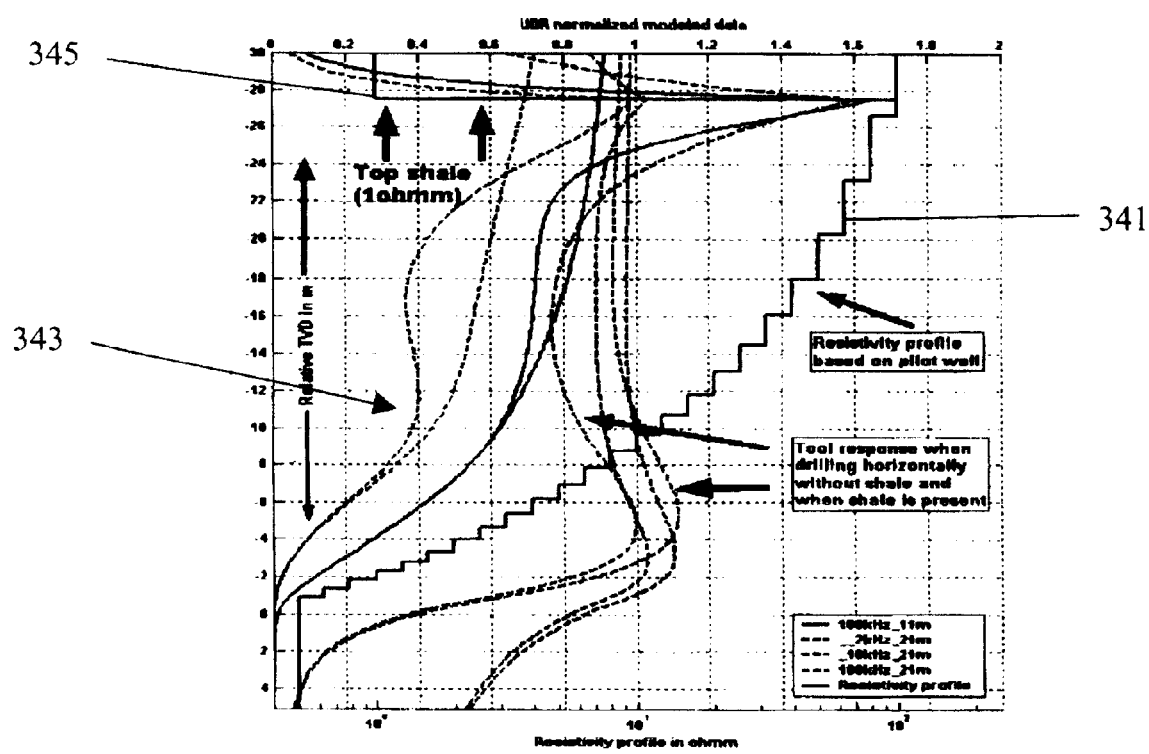
FIG. 3D shows examples of predicted tool responses based on another predicted resistivity profile in accordance with one embodiment of the invention.

FIG. 3D shows another model where the resistivity profile changes with vertical depths. In this model, there is a top shale above the bed boundary 345, and the predicted tool response curves (shown generally at 343) are also shown.

FIGS. 3A–3D are examples of reservoir models that may be used with the invention. However, the exact model is not intended to limit the invention. In practice, the exact formation model will be derived from information obtained from pilot wells drilled near the well of interest. Those having ordinary skill in the art will be able to devise other reservoir or formation models that do not depart from the scope of the invention.

Figure 4:
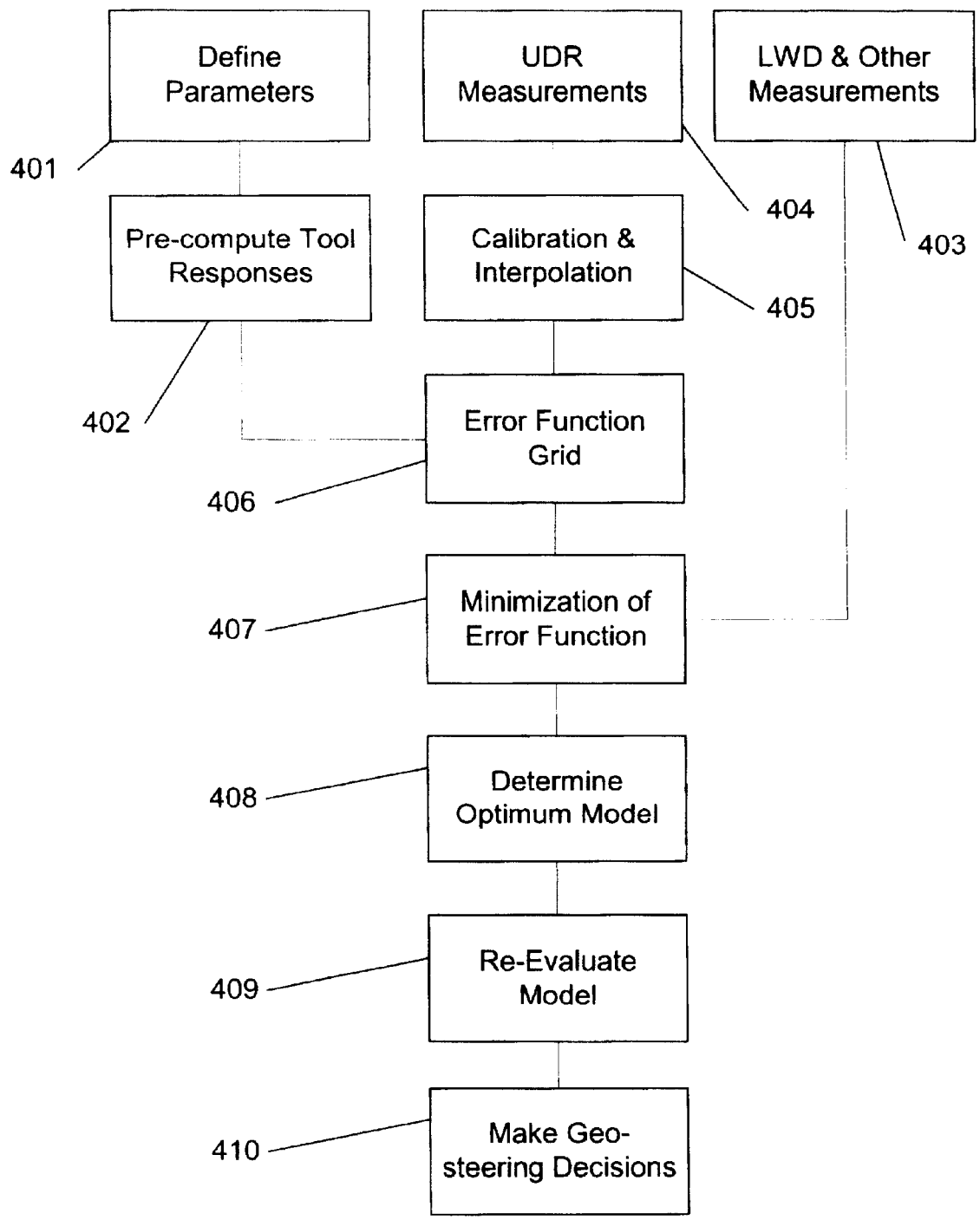
FIG. 4 shows one embodiment of a method in accordance with the invention.

A method in accordance with embodiment of the invention can accurately determine a well location in the formation by comparing the measurement data obtained with an LWD resistivity tool with the expected tool responses based on the selected formation models. In some embodiments, an LWD resistivity tool comprises a UDR tool, such as the one shown in FIG. 1. FIG. 4 shows one embodiment of an inversion method for determining reservoir characteristics in accordance with the invention. The disclosed inversion techniques estimate the distance to boundaries with resistivity contrast, such as fluid and lithologic contacts, to map a reservoir and to reduce true vertical depth uncertainty, for example.

In some embodiments, the method includes generating a formation model and defining the parameters used to characterize the reservoir and formation (shown at step 401). This may include any number of different parameters that define the formation. As noted above, the formation model is typically based on information (e.g., resistivity layers and petrophysical parameters) obtained from nearby pilot wells and seismic surveys. The number and type of parameters are often dictated by the formation model used. Thus, the parameters used to characterize the formation and reservoir are not intended to limit the invention. For example, the parameters may include the distance to OWC, the top shale position, the bottom shale position, the formation facies, and the bottom resistivity profile. The parameters may also include a distance to a formation heterogeneity, such as a salt dome, a distance to a fault, or other suitable parameters known in the art.

In some embodiments, the method includes pre-computing predicted, or theoretical, UDR tool responses for every possible combination of parameter values, including the tool positions within the formation or reservoir (shown at step 402). For example, FIG. 3C shows predicted tool responses (333a, 333b, 334a, 334b, 335a, 335b, 336a, and 336b) for two different predicted resistivity profiles (331, 332). Precomputing UDR tool responses may include predicting the tool responses for all possible resistivity profiles. Although pre-computing is not necessary, it may be advantageous to speed the inversion process as the data is being received.

In one embodiment, each parameter is divided into a number of discrete values over the range of possible values for that parameter, and the UDR tool responses are predicted for every combination of the discrete values of the parameters. In addition, the calculated tool responses may be interpolated to a finer grid to include parameter values that fall between the discrete values. The precision of the model may be controlled by selecting the number of discrete values to use for each parameter.

In some embodiments, this step includes creating a table, or database, for the predicted tool responses for all combinations of parameters. These predicted tool responses may be stored as tables or database to minimize computational efforts in actual use. These tables or database may be stored in a memory in a processor onboard the tool or in a surface computer.

The method also includes making measurements with an LWD resistivity tool, such as the UDR tool described above, during the drilling process (shown at step 404). These measurements are the tool's actual responses to the formation and reservoir surrounding the tool. As noted above, the measurements are preferably obtained with arrays having different spacings and operated at different frequencies to provide an extensive set of data to improve the accuracy of the prediction. One of ordinary skill in the art would appreciate that the measurement data may include signal amplitudes, phases, phase shifts, and attenuation. In addition, the detected signals may include the real signals (R-signals) and the quadrature signals (X-signal). These different types of measurements may be used individually or in combination to increase the accuracy of the inversion.

The method may next include calibration and interpolation (shown at step 405). This may include normalizing the tool measurements with an air calibration of the tool to remove sonde error. Because these tools have very long reach, it might be necessary to perform sonde error calibration at several heights from the ground to derive a sonde error correction curve. Once the sonde errors are removed, the measurement data become tool independent.

Because a UDR tool takes measurements at discrete locations in the formation, the data may be interpolated on a measurement depth grid to determine the actual tool response at any location. In these embodiments, the interpolation is used to fill in the gaps in the data. Typically, the tool responses will not change drastically between measurement location. Thus, interpolation between data points provides an accurate estimation of the actual tool response at all points in between.

In some embodiments, the tool measurement data are transmitted to the surface using telemetry methods known in the art. These data are then processed by the surface computer, either at the job site or remotely. If processed remotely, the data may be transmitted to the remote computer using any communication means known in the art, including satellite links or the internet. Alternatively, the measurements themselves may be processed by a downhole computer to normalize the data (e.g., sonde correction) before the data are sent up hole, or to perform other computations downhole. How and when the data are transmitted to the surface is not germane to the invention, and it is not intended to limit the invention. In fact, it is envisioned that the advancement of the drilling art may one day enable the method to be entirely performed downhole.

The method next includes generating an error function on a grid (shown at step 406). For each of the formation models based on the combinations of parameters for which the tool response has been predicted, an error function is generated. At each point on the grid that corresponds to a particular parameter set of the formation model, a cost function (error function) may be calculated according to any function that quantifies the error between the predicted tool responses and the actual tool responses. Any error function that is known in the art or that may be derived by a person having ordinary skill in the art may be used without departing from the scope of the invention. For example, an error function may be defined as a square root of a weighted sum of an average of squares of a difference between the predicted tool response and the actual tool response. One such function is shown in Eq. 1:

$$e_{fit}(n_1, n_2, \ldots n) = \sqrt{\sum_{i=1}^{k} \frac{(x_i - m_i)^2}{k^2}} \quad \text{Eq. 1}$$

where $e_{fit}(n_1, n_2, \ldots n)$ is the error function (sometimes called the "cost function") for an n-dimension grid with n formation parameters, e.g., the measurement depth and the tool position in the formation model; k is the number of UDR measurements being considered; $x_i$ is the i-th predicted response of the UDR tool; and $m_i$ is the i-th normalized actual tool response. In some embodiments, the cost function is also calculated for each measurement depth point, thereby extending the grid by another dimension.

Having the error functions calculated at each grid point makes the search for the optimum formation model straightforward. In some embodiments, this step involves a straightforward search of the cost function grid along all dimensions of the grid for the absolute minimum value of the cost function. This step may also include identifying local minimums of the error function in the error function grid. In some embodiments, this step may include minimizing the error function to below a predetermined criterion by adjusting formation model parameters.

In some embodiments, the method may also include the minimization of the error function (shown at step 407), with or without constraints provided by other measurements. This may include other LWD measurements that are taken at a different time or simultaneously with the UDR measurements. Such measurements may include, for example, shallow resistivity measurements, various types of nuclear LWD measurements, seismic measurements, sonic tool measurements, NMR measurements, and gamma ray measurements. This may also include other data that have already been collected about the formation through which the BHA is drilling. The other data may include those collected from a nearby pilot hole, including seismic data, or any other data related to the formation or reservoir.

These other measurements may be used to constrain the minimization of the cost function in several ways. For example, the constraints may be used to favor specific values of one or more parameters before the minimization search. Alternatively, these constraints may be used to eliminate some formation model candidates. For example, a gamma ray log may indicated that the BHA is located in shale. In this circumstance, all BHA positions that are outside of shale are eliminated from consideration. In another example, knowledge of the TVD of the OWC combined with trajectory information (e.g., data from MWD devices on the BHA) may enable the distance to the OWC to be limited to a certain range. All distances to OWC that lie outside this range may be eliminated. One having ordinary skill in the art will be able to devise other constraints that may be applied without departing from the scope of the invention.

Furthermore, constraints may be applied along the measurement depths. In this case, the constraints may be applied at each measurement depth and the cost function along the measurement depths are summed for specific parameters. Alternatively, constraints on the variation of the model parameters along the measurement depth dimension may be implemented by local averaging before minimization.

Additionally, to streamline the process, the inversion may be divided into separate computations, each characterized by a particular set of constraints. For example, one computation may solve for the distance to OWC, while another computation may solve for the tool position with respect to a reservoir roof or floor. The different computations may also be performed simultaneously. By combining the results of these computations, the minimization of the error/cost function may be limited to only those models that agree with the computations.

Further, a minimal residual criterion may be applied during the minimization of the error function. A minimal residual criterion will penalize more complex models in favor of simpler models. In some embodiments, this may be accomplished by increasing the error function for a particular formation model based on the complexity of that model. In other embodiments, the minimal residual criterion may be applied by a human operator viewing the potential models that fit the data and selecting the least complex model. Those having ordinary skill in the art will be able to devise other methods for a minimal residual criterion without departing from the scope of the invention.

It is noted that FIG. 4 shows a number of steps to be performed before the minimization of the error function (step 407). These steps need not be performed concurrently. For example, defining the parameters (step 401) and pre-computing the tool responses (step 402) may be performed well in advance of the other steps, so that the table of predicted tool responses has already been generated when the UDR measurements (step 404) are taken. Also, FIG. 4 shows one embodiment of a method in accordance with the invention. Other embodiments may include more or fewer steps than what is shown in FIG. 4.

The method may next include determining the optimum model of the formation (shown at step 408). Each of the relevant models that were selected in the minimization of the error function may be considered. In some embodiments, these models are displayed so that an operator may determine the most valid model based on a comparison of the error function value, the relevance of the model to the expected formation model, and sensitivity of the optimum parameters to the fit of the model.

The method may next include a re-evaluation of the formation model (shown at step 409). This may include a comparison of the error function for the optimum model to a preselected threshold. If the value of the error function is below the preselected threshold, the model is valid. If not, the model may be adjusted and the inversion process repeated until the value of the error function for the optimum model is below the preselected threshold. Adjusting the model may include changing the parameters used to define the formation, as well as changing the constraints used to select the optimum model. Based on the re-evaluation of the formation model, certain steps of the method may be repeated. For example, upon re-evaluating the model, the method may include returning to the minimization of the error function. Other combination of repeating steps may be performed without departing from the scope of the invention.

For example, based on the actual tool response and the optimum model selected, and operator may determine that no bottom shale exists. The parameters may be adjusted so that the distance to bottom shale is not included in the parameters used to model the formation. Also, the constraints may be adjusted so that the BHA will not be considered to be located in shale. Following these adjustments, the inversion process may be repeated.

In some embodiments, the method may also output a quality factor to assist the operator in determining the validity of the optimum model. One of ordinary skill in the art would appreciate that various quality functions may be used for this purpose. For example, a quality function may simply be a percentage of the minimized cost function, as shown in Equation 1, with respect to the measurement data. In other embodiments, the error function may be used to show the possible error in the data. Error bars may be used to show the potential error so that a user or operator may have confidence in the data and the optimum model selected. In some embodiments, error bars may be graphically displayed to show the minimization and error.

In some embodiments, the method may then include making geosteering decisions (shown at step 410). This may include selecting a "steering solution," which is selecting the desired path for the BHA. Geosteering decisions may be based on the most efficient placement for a well in the formation in the model well. Geosteering decisions may be made to avoid shale or a salt dome, as well as to maintain the distance between the OWC and the well. Examples of geosteering applications are described below with reference to FIGS. 6A–6G.

Figure 5:
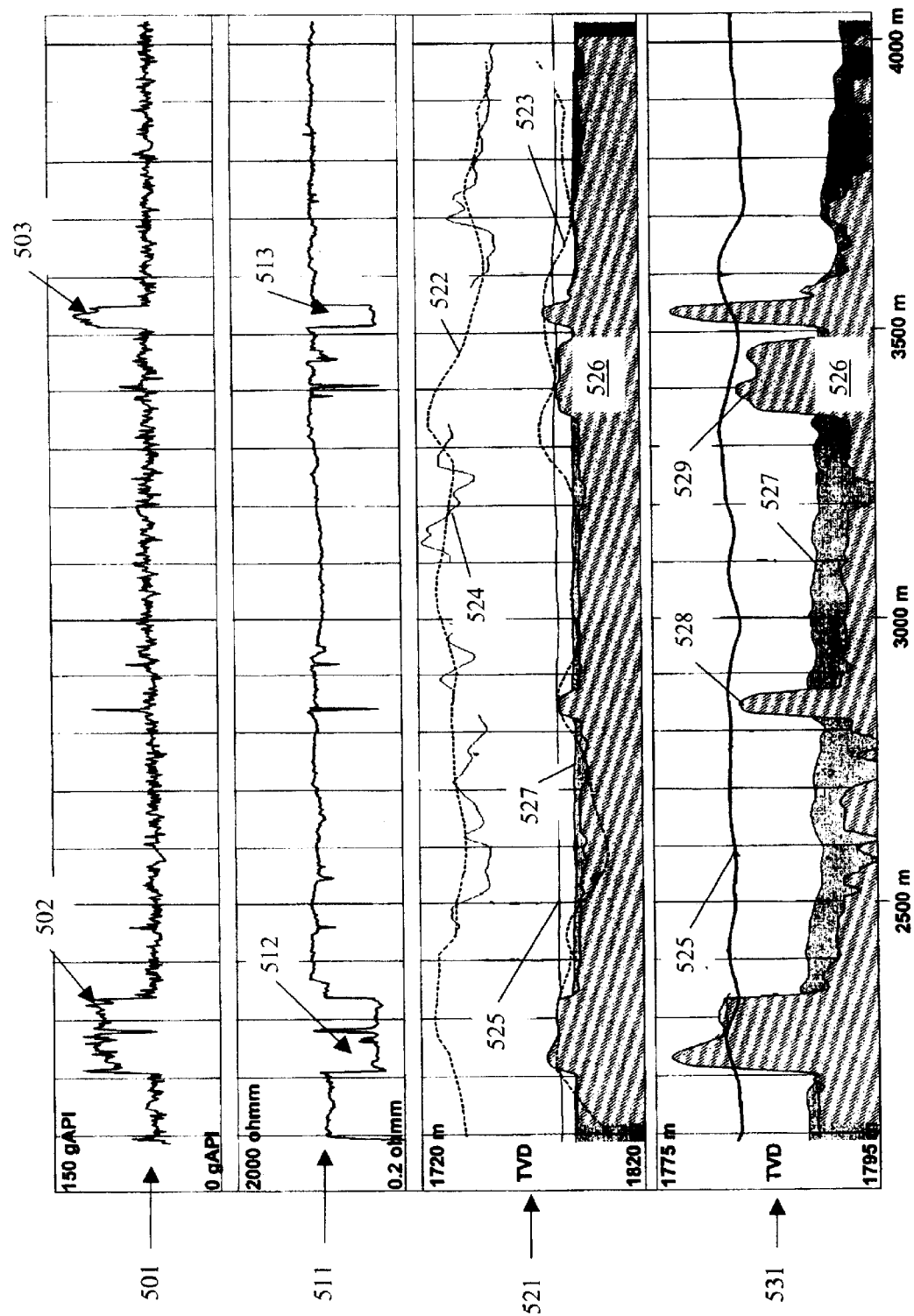
FIG. 5 shows a shallow resistivity log, a gamma ray log, and a formation model determined from a ultra deep resistivity tool in accordance with one embodiment of the invention.

Applications of methods of the invention in locating a wellbore in a formation and in determining the distance from the wellbore to bed boundaries are illustrated in the following examples. FIG. 5 shows 4 plots of data collected from LWD measurements as well as estimations of the distances to reservoir boundaries. The plot shown at 501 is a gamma ray log for an LWD gamma ray tool. The gamma ray plot 501 remains relatively constant over the measured depth, except for several peaks (e.g., at 502 and 503) at various points. For most regions, the low gamma ray counts suggest the formation is of the sand-stone type, while the sudden increases in the gamma ray counts at peaks 502 and 503 suggest the presence of shales at these measurement depths.

The second plot 511 shows data collected with a conventional resistivity tool, such as a geovision tool sold under the trade name of GVR™ by Schlumberger Technology Corporation (Houston, Tex.). Again, the plot 511 is relatively constant, except for several dips of lower resistivity at 512 and 513. The first dip 512 occurs at the same measured depth as the first spike 502 in the gamma ray plot 501; this is consistent with the presence of a shale layer at these measurement depth. The second dip 513 occurs at the same measured depth as the second spike 503 in the gamma ray plot 501, also suggesting the presence of a shale layer at this measurement depth.

The plot at 521 shows various formation properties, as computed by an embodiment of an inversion method in accordance with the invention, as well as properties computed by other means. The upper dashed line 522 represents the top of the reservoir based on seismic surveys, and the lower dashed line 523 represents the bottom of the reservoir based on seismic surveys. The solid line at 525 represents the path of the well through the formation.

The plot 521 also shows the top of the reservoir 524, the bottom shale 526, and the OWC 527, as determined by a UDR tool and a method of the invention. Note that the top of the reservoir 524 determined by the UDR tool is in close agreement with the seismic estimation of the top of the reservoir 522. Similarly, the bottom shale 526 determined by inversion is in close agreement with the seismic estimation of the bottom shale 523. These results attest to the reliability of the UDR tool in locating bed boundaries. Further note that the top of the reservoir 524 is located at more than 45 meters TVD above the borehole in some regions. This result shows that the UDR tool can indeed determine bed boundaries at a distance of tens of meters away from the wellbore.

The plot at 531 is an expanded view of the area surrounding the well path 525 in plot 521. The plot 531 shows the well path 525 in relation to the bottom shale 526 and the OWC 527. The well path 525 passes through the bottom shale 526 in at least two places that correspond to the spikes 502, 503 and dips 512, 513 discussed above. The spikes 502, 503 in the gamma ray plot 501 occur when the tool is in the bottom shale 526. Similarly, the dips 512, 513 in the resistivity shown in the shallow resistivity plot 511 occur when the tool is in the bottom shale 526. Additionally, the UDR measurements are able to determine the distance to the bottom shale 526 at points where the well path 525 is very near the bottom shale 526, such as at points 528 and 528. It is noted that the shallow resistivity log 501 is not able to detect the bottom shale 526, even at points 528, 529 where the well path 525 is very close to the bottom shale 526.

Embodiments of UDR tools in accordance with the invention, when used in conjunction with an inversion method in accordance with the invention, enable the detection of the bottom shale 526 when the tool is relatively far away from the bottom shale 526. Because of the increased depth of investigation, geosteering decisions may be made to steer the BHA to avoid the bottom shale, if desired.

FIG. 5 also shows that the estimation of the OWC level 527, in plot 531, for example, decreases from left to right. This may be attributable to the survey uncertainty in determining the TVD of the tool. Inversion methods in accordance with the invention may allow this error to be corrected. It is generally a good assumption that the OWC in a contiguous reservoir that is not being produced will be at the same TVD throughout the reservoir. The effects of gravity on the fluids of different density will generally make this true. Thus, the measurement of the OWC level from a pilot hole may be applied to all points in a reservoir. This correction will enable the correction of the TVD estimation of the BHA, as well as a correction for the TVD of the other formation features detected by the UDR tool.

Certain embodiments of inversion methods in accordance with the invention enable geosteering. "Geosteering" generally describes the process of controlling the direction of the well so that the well is in the best position for an efficient recovery of the hydrocarbons in the reservoir. Examples of geosteering applications are shown in FIGS. 6A–6G.

Figure 6:
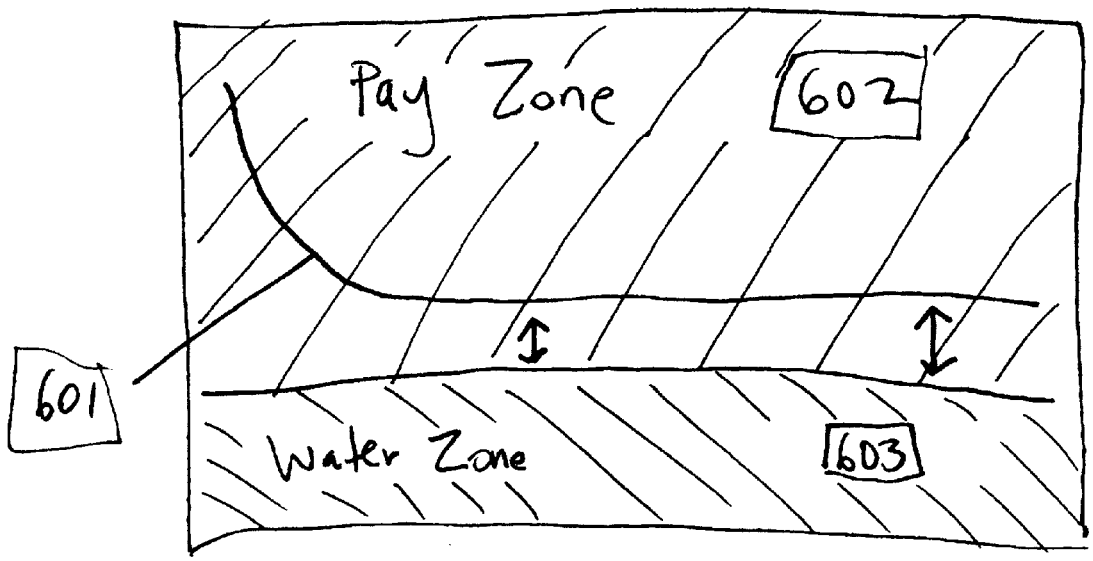
FIG. 6A shows one example of a geosteering situation in accordance with one embodiment of the invention.
FIG. 6B shows one example of a geosteering situation in accordance with one embodiment of the invention.
FIG. 6C shows one example of a geosteering situation in accordance with one embodiment of the invention.
FIG. 6D shows one example of a geosteering situation in accordance with one embodiment of the invention.
FIG. 6E shows one example of a geosteering situation in accordance with one embodiment of the invention.
FIG. 6F shows one example of a geosteering situation in accordance with one embodiment of the invention.
FIG. 6G shows one example of a geosteering situation in accordance with one embodiment of the invention.
Figure 6:
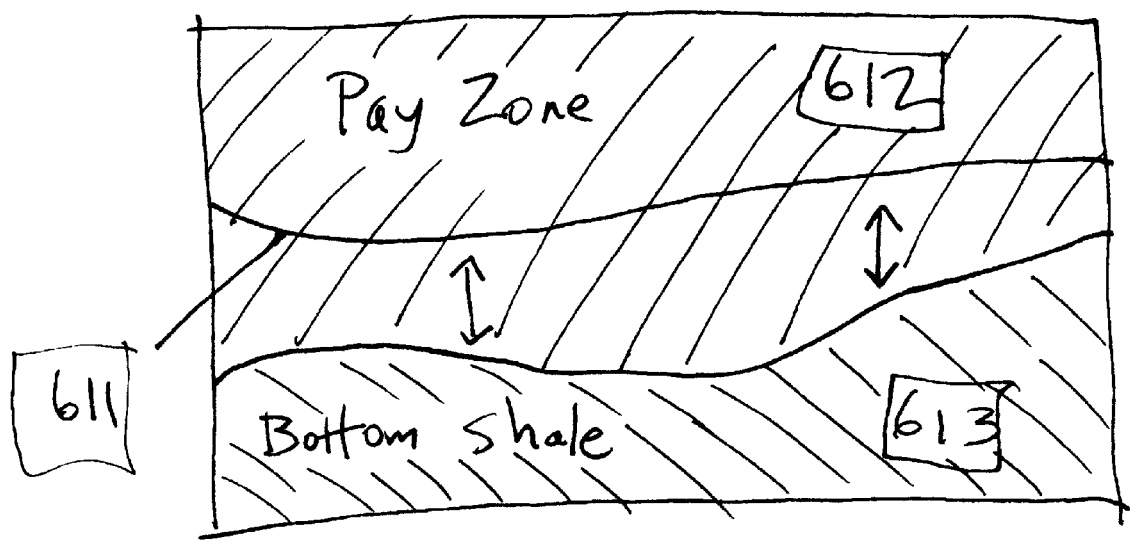

FIG. 6A shows the situation where it is desired to drill through a reservoir 602, or a "pay zone," while keeping the well trajectory 601 at a selected distance above a water zone 603 or an OWC. Using an UDR tool and an inversion method in accordance with the invention, the distance to the water zone 603 is determined, and the BHA is steered to that the well 601 is always at the same distance above the water zone 603.

It is noted that the OWC 603, or any of the other boundaries shown in the following examples, my be considered a "resistivity contrast." That is, the UDR tool, used with an inversion method, is able to determine a distance to a contrast in the resistivity of the formation.

FIG. 6B shows another geosteering situation. In this case, it is desired to drill a well 611 in a pay zone 612 at a constant distance above a bottom shale 613. The TVD of the bottom shale 613 often changes along the HD of the reservoir. Using a UDR tool and inversion method in accordance with the invention enables the BHA to be steered so that the well 611 remains at a constant distance above the bottom shale 613.

Figure 6C:
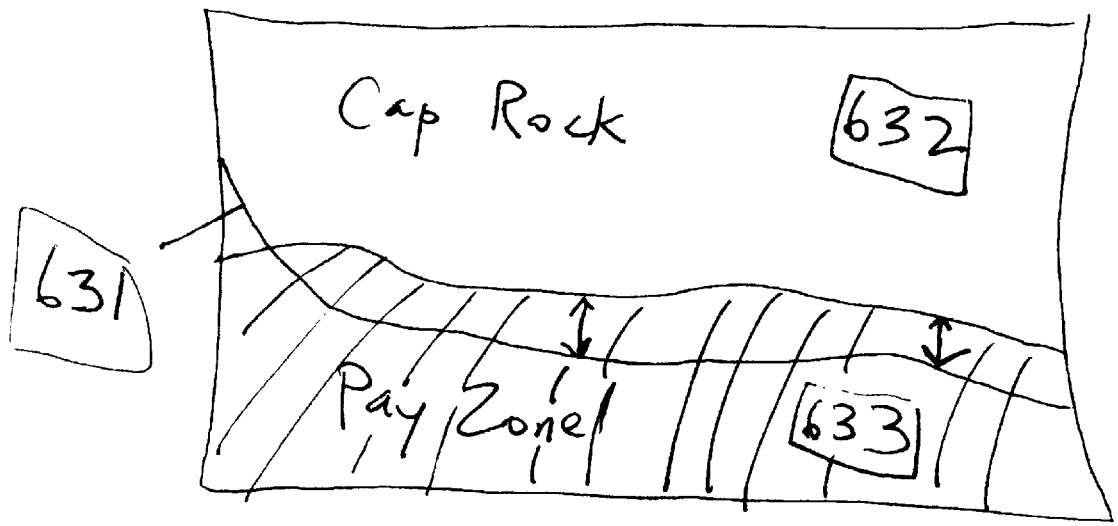

FIG. 6C shows a situation where it is desired to drill a well 631 trough a pay zone 633 at a selected distance below a cap rock formation 632. Again, using embodiments of the invention, the BHA may be steered so that the well 631 is in the desired location.

Figure 6D:
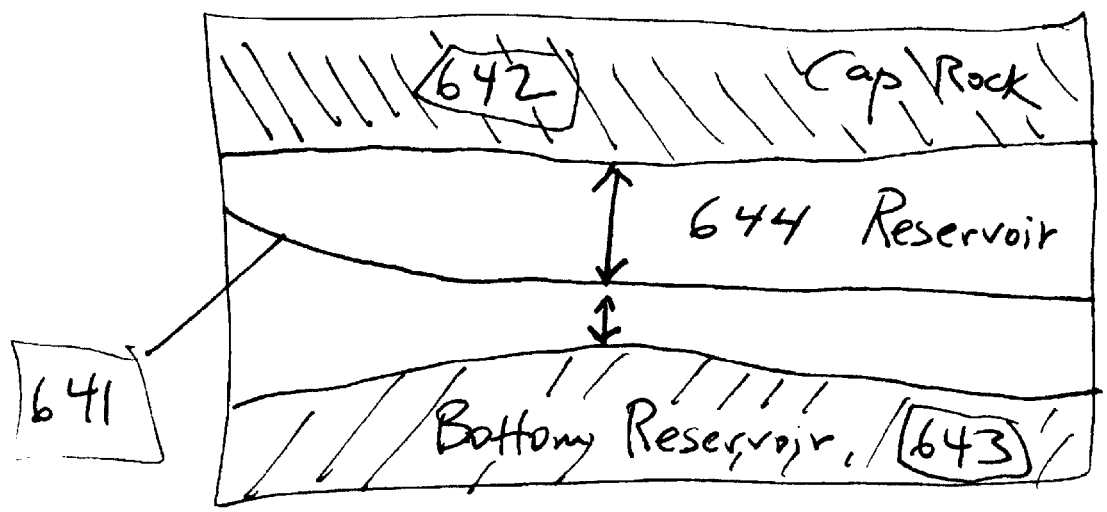

FIG. 6D shows a situation where a well 641 must be drill through a reservoir 644 that lies between a cap rock 642 and the bottom of the reservoir 643. Embodiments of the invention enable the determination of the distances from the tool to the cap rock 642 and the bottom of the reservoir 643. The BHA may be steered so that the well 641 lies between the two boundaries.

Figure 6E:
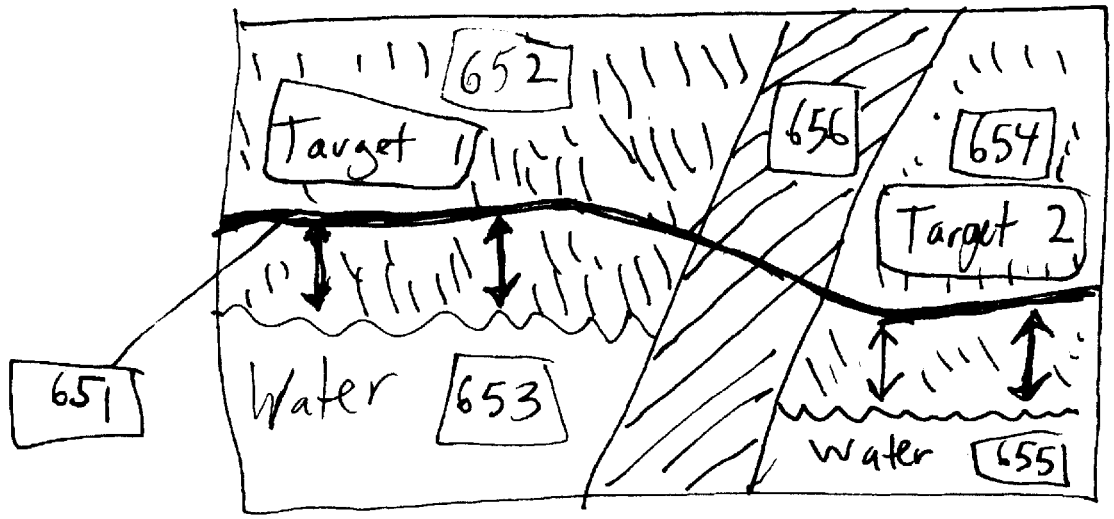

FIG. 6E shows a situation where a well 651 is located in a first reservoir 652 above a water zone 653, when the well then passes through another zone 656 (e.g., salt dome, shale, fault, etc.). Upon passing into a second reservoir 654, embodiments of the invention enable the determination of the distance to a second water zone 655 so that the BHA may be steered and the well located at a selected distance from the second water zone 655.

Figure 6F:
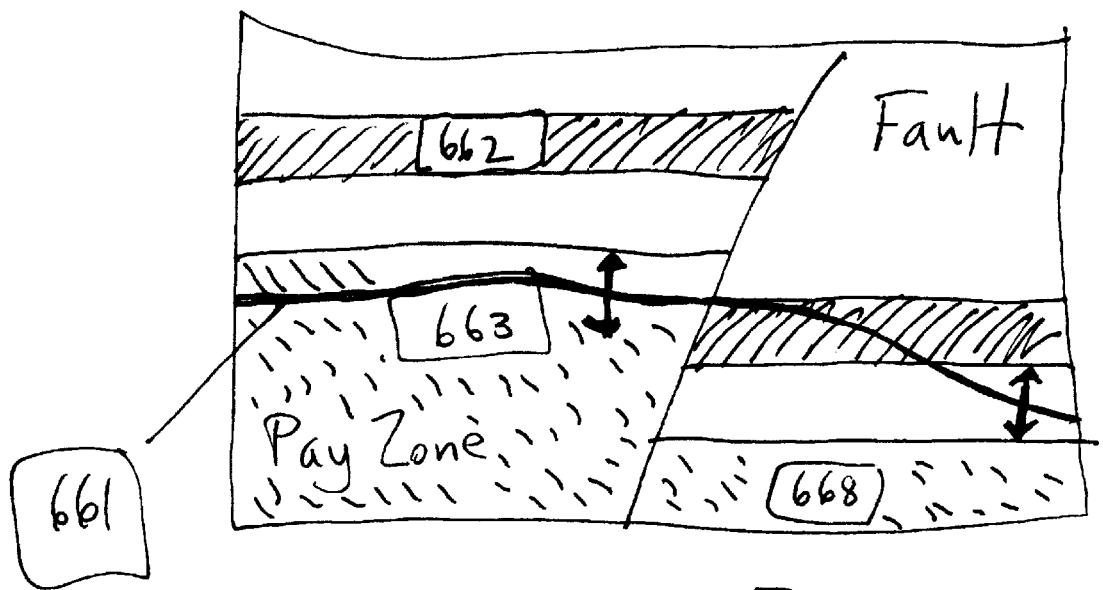

FIG. 6F shows a well 661 that is drilled through a fault 654. The well 661 is drilled through a reservoir 663 under a top boundary 662, and then the well 661 penetrates the fault 654. Upon passing through the fault 654, embodiments of the invention enable the determination of the location of the reservoir 668 on the other side of the fault 654. The BHA may be steered so that the well 661 is drilled in the reservoir 668 on the other side of the fault 654.

Figure 6G:
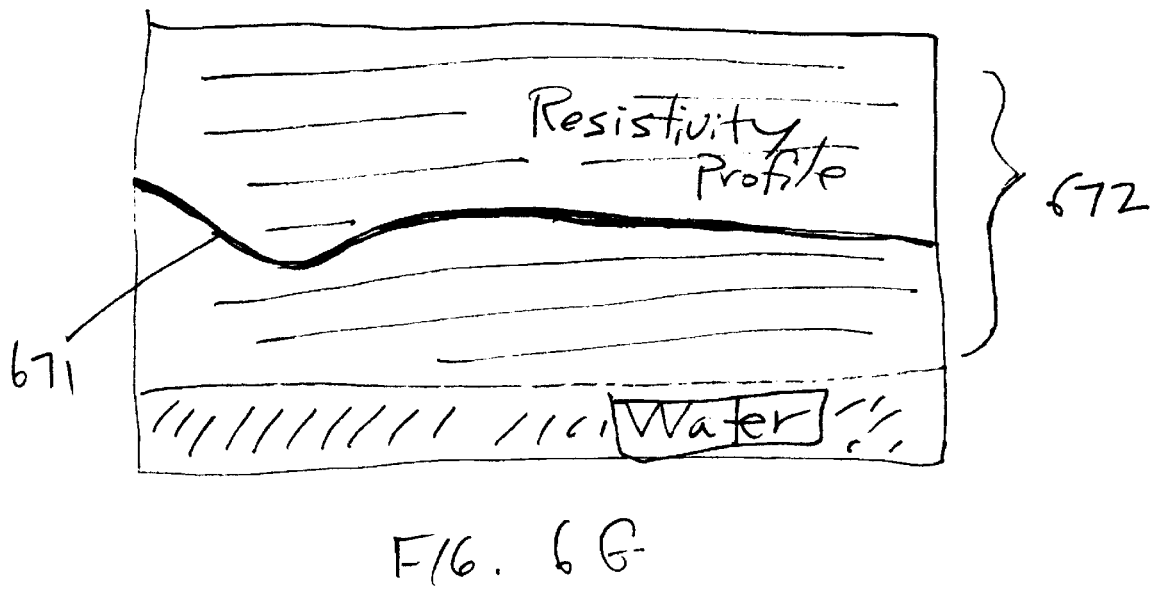

FIG. 6G shows another feature of certain embodiments of the invention. Often the OWC in a reservoir is not a sharp boundary. In these cases the water content changes over a transition zone 672 in the formation. For example, FIG. 2 shows a resistivity profile where the resistivity in the reservoir decreases as the TVD approaches the OWC (at 204 in FIG. 3). Embodiments of the invention enable the resistivity profile to be determined as a function of TVD. This enables the well 671 to be located in the position that will have the most efficient production.

Some embodiments of the invention relate to systems for determining distances from a wellbore to bed boundaries or conductivity contrast, for mapping a reservoir, and for reducing the uncertainty in the true vertical depth estimates from other measurements. A system in accordance with the invention may be implemented in a general computer or a computer onboard the tool.

Figure 7:
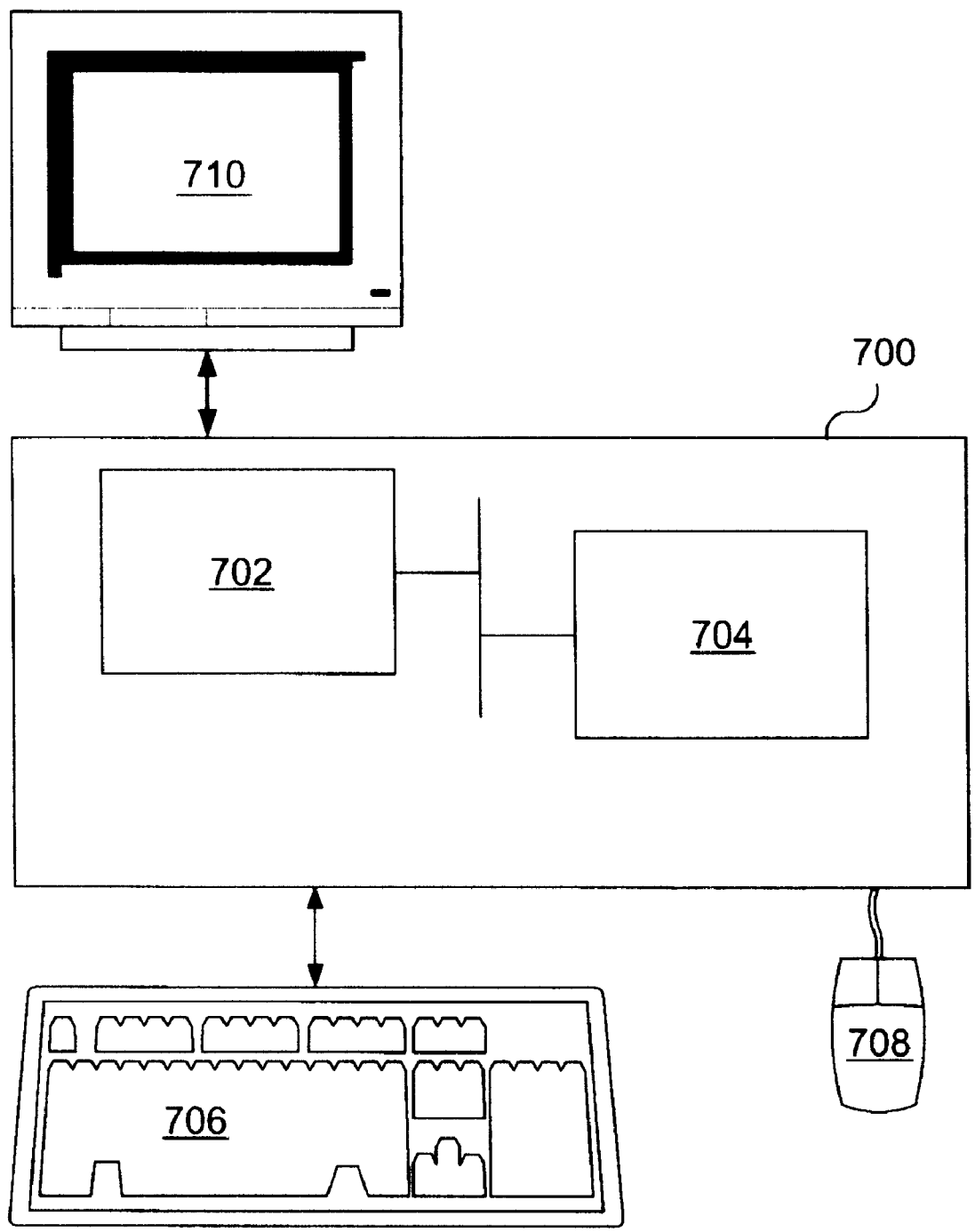
FIG. 7 shows a general computer that may be used with embodiments of the invention.

FIG. 7 shows a general computer that may be used with embodiments of the invention. As shown, the computer includes a display 710, a main unit 700, and input devices such as a keyboard 706 and a mouse 708. The main unit 700 may include a central processor 702 and a memory 704. The memory 704 may store programs having instructions for performing methods of the invention.

The programming may be accomplished through the use of one or more program storage devices readable by the computer processor and encoding one or more programs of instructions executable by the computer for performing the operations described above. The program storage device may take the form of, e.g., one or more floppy disks; a CD ROM or other optical disk; a magnetic tape; a read-only memory chip (ROM); and other forms of the kind known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Thus, these processing means may be implemented in the surface equipment, in the tool, or share by the two as known in the art. In addition, the surface computer may be located at a site away from the well and communication means (such as satellite link or internet) may be used to transmit the data, in real time or in delayed mode, between the tool and the computer.

Embodiments of the invention may present one or more of the following advantages. A UDR tool used in conjunction with an inversion method may provide higher resolution and accuracy than seismic surveys in determining the position of a well within a reservoir. Advantageously, based on the higher resolution and better accuracy, the well position may be improved so as to improve the efficiency of production from the well.

Advantageously, the increased depth of investigation of embodiments of a UDR tool in accordance with the invention enable the detection of reservoir boundaries at a position where it is still possible to steer the BHA to avoid the boundaries. These boundaries are not outside the detection range of a UDR tool at a position where proactive geosteering may avoid the boundaries.

Advantageously, embodiments of the invention may enable the detection of geological events in the reservoir so that the path of the well may be proactively steered to avoid undesirable geological events.

Advantageously, embodiments of the invention are suited for proactive well placement and well landing so that a well is positioned in the most efficient position for production. Embodiments of the invention may also reduce the uncertainty in the TVD determination of the BHA.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for geosteering while drilling a formation, comprising:

generating a plurality of formation models for the formation, wherein each of the plurality of formation models includes a set of parameters and a deep reading logging-while-drilling resistivity tool therein, wherein locations of the deep reading logging-while-drilling resistivity tool differ in the plurality of formation models;

computing predicted tool responses for the deep reading logging-while-drilling resistivity tool in the plurality of formation models;

acquiring resistivity measurements using the deep reading logging-while-drilling resistivity tool in the formation;

determining an optimum formation model based on a comparison between an actual tool response and the predicted tool responses; and steering a bottom hole assembly based on the optimum formation model.

2. The method of claim 1, wherein the deep reading logging-while-drilling resistivity tool is a deep reading induction tool.

3. The method of claim 1, wherein the deep reading logging-while-drilling resistivity tool is a deep reading propagation tool.

4. The method of claim 1, wherein the deep reading logging-while-driling tool comprises a first transmitter disposed about 11 meters from a receiver and a second transmitter disposed about 21 meters from the receiver.

5. The method of claim 1, wherein the determining the optimum formation model comprises:

calculating a value of an error function at an error function grid in each of the plurality of formation models; and finding a formation model that produces a minimum value of the error function.

6. The method of claim 5, wherein the calculating the value of the error function is performed with constraints derived from other measurements.

7. The method of claim 6, wherein the other measurements comprise at least one selected from the group consisting of measurements from a logging-while drilling gamma ray tool, measurements from a logging-while-drilling shallow resistivity tool, data from seismic maps, measurements form logging-while-drilling nuclear magnetic resonance tool, and measurements made in a pilot hole.

8. The method of claim 5, further comprising using the value of the error function to provide an estimation of an error in determining a distance to a resistivity contrast.

9. The method of claim 5, wherein the error function is defined as a square root of a weighted sum of an average of squares of a difference between the predicted tool response and the actual tool response.

10. The method of claim 4, further comprising applying a minimization residual criterion to the plurality of formation models.

11. The method of claim 1, wherein the steering the bottom hole assembly comprises steering the bottom hole assembly to avoid a formation structure determined from the optimum formation model.

12. The method of claim 11, wherein the formation structure comprises one selected from the group consisting of a shale zone and a water zone.

13. The method of claim 1, wherein the steering the bottom hole assembly is performed to maintain a selected distance between the bottom hole assembly and a resistivity contrast determined from the optimum formation model.

14. The method of claim 13, wherein the resistivity contrast comprises a formation boundary.

15. The method of claim 1, wherein the acquiring the resistivity measurements is performed taken at a plurality of frequencies and at at least two different transmitter-receiver spacings.

16. The method of claim 1, further comprising normalizing the resistivity measurements to correct for sonde errors.

17. The method of claim 1, further comprising determining a distance between the bottom hole assembly and a formation boundary.

18. The method of claim 17, wherein the formation boundary is an oilwater contact.

19. The method of claim 18, further comprising correcting a true vertical depth estimate of the bottom hole assembly based on a known value of a depth of the oilwater contact and the distance between the bottom hole assembly and the oilwater contact.

20. The method of claim 1, further comprising determining a formation resistivity profile.

21. A method for geosteering, comprising:
obtaining an optimum formation model derived from data from a deep reading logging-while-drilling resistivity tool using an inversion technique; and
steering a bottom hole assembly to locate a well in a selected position with respect to formation boundaries.

22. The method of claim 21, wherein the steering the bottom hole assembly is performed to maintain a selected distance between the bottom hole assembly and a reservoir boundary determined from the optimum formation model.

23. The method of claim 21, wherein the steering the bottom hole assembly is performed to maintain the bottom hole assembly between two or more reservoir boundaries.

24. The method of claim 23, further comprising selecting a desired well location based on the optimum formation model, and wherein the steering the bottom hole assembly comprises steering the bottom home assembly so that the well is positioned in the desired well location.

25. A system for geosterring while drilling in a formation, comprising a computer having a processor and a memory, wherein the memory stores a program having instructions for:
generating a plurality of formation models for the formation, wherein each of the plurality of formation models includes a set of parameters and a deep reading logging-while-drilling resistivity tool therein, wherein locations of the deep reading logging-while-drilling resistivity tool differ in the plurality of formation models;
computing predicted tool responses for the deep reading logging-while-drilling resistivity tool in the plurality of formation models;
acquiring resistivity measurements using the deep reading logging-while-drilling resistivity tool in the formation;
determining an optimum formation model based on a comparison between an actual tool response and the predicted tool responses; and
selecting a steering solution for the bottom hole assembly.

26. The method of claim 25, further comprising normalizing the resistivity measurements to correct for sonde errors.

27. A system for geosteering while drilling in a formation, comprising a computer having a processor and a memory, wherein the memory stores a program having instructions for:
obtaining an optimum formation model derived from data from a deep reading logging-while-drilling resistivity tool using an inversion technique; and
selecting a steering solution for a bottom hole assembly.

28. A method for well characterization while drilling a formation, comprising:
generating a plurality of formation models for the formation, wherein each of the plurality of the formation model includes a set of parameters and a deep reading resistivity tool therein, wherein locations of the deep reading resistivity tool differ in the plurality of the formation models;
computing predicted tool responses for the resistivity tool in the plurality of formation models;
acquiring resistivity measurements using the deep reading resistivity tool in the formation; and
determining a formation resistivity profile.

29. The method of claim 28, wherein the deep reading resistivity tool is a deep reading induction tool.

30. The method of claim 28, wherein the resistivity tool is a deep reading propagation tool.

31. The method of claim 28, wherein the deep reading resistivity tool comprises a first transmitter disposed about 11 meters from a receiver and a second transmitter disposed about 21 meters from the receiver.

32. The method of claim 28, further comprising normalizing the resistivity measurements to produce a tool independent response.

33. The method of claim 28, wherein the resistivity profile exists in a transition zone in the formation.

* * * * *